(12) United States Patent
Hashimoto et al.

(10) Patent No.: US 7,889,240 B2
(45) Date of Patent: *Feb. 15, 2011

(54) DIGITAL CAMERA WHICH DETECTS A CONNECTION TO AN EXTERNAL DEVICE

(75) Inventors: Tetsuya Hashimoto, Ichikawa (JP); Hiroki Fukuoka, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 974 days.

This patent is subject to a terminal disclaimer.

(21) Appl. No.: 11/384,545

(22) Filed: Mar. 21, 2006

(65) Prior Publication Data

US 2006/0158528 A1 Jul. 20, 2006

Related U.S. Application Data

(63) Continuation of application No. 10/046,287, filed on Jan. 16, 2002, now Pat. No. 7,046,276, and a continuation of application No. 09/545,926, filed on Apr. 10, 2000, now Pat. No. 6,344,875, and a continuation of application No. 08/606,196, filed on Feb. 21, 1996, now Pat. No. 6,111,604.

(30) Foreign Application Priority Data

| Feb. 21, 1995 | (JP) | .................................. 7-032589 |
| Feb. 21, 1995 | (JP) | .................................. 7-032595 |
| Feb. 28, 1995 | (JP) | .................................. 7-040136 |
| Feb. 28, 1995 | (JP) | .................................. 7-040139 |
| Aug. 17, 1995 | (JP) | .................................. 7-209724 |

(51) Int. Cl.
*H04N 5/225* (2006.01)
*H04N 5/76* (2006.01)

(52) U.S. Cl. ............. 348/220.1; 348/207.1; 348/231.99

(58) Field of Classification Search ................. 348/220, 348/207.99, 231.3, 231.6, 207.1, 206.11, 348/220.1, 231.99, 211.1, 222.1, 207.11; 396/300

See application file for complete search history.

(56) References Cited

U.S. PATENT DOCUMENTS 611,662 A 10/1898 Turner (Continued)

FOREIGN PATENT DOCUMENTS

JP 3-213066 9/1991

(Continued)

OTHER PUBLICATIONS

Ricoh Digital Electronic Still (Video) Camera, Instruction Manual for Using DC-1, 9 pages.

(Continued)

*Primary Examiner*—David L Ometz
*Assistant Examiner*—Ahmed A Berhan
(74) *Attorney, Agent, or Firm*—Oblon, Spivak, McClelland, Maier & Neustadt, L.L.P.

(57) ABSTRACT

An electronic camera and method of operating an electronic camera which detects whether an external device such as a personal computer is properly connected to the camera and in a state which permits communication. The camera monitors a data terminal ready (DTR) signal of an RS-232 connection in order to determine that the external device is properly connected and in a state which permits communication. Once the proper connection is detected, the camera can either transmit or receive images and/or audio from the external device. Accordingly, a specific switch which places the camera in a communication mode can be eliminated. Further, a single switch may be utilized for both controlling whether the camera records or plays images when there is no device connected, and which controls whether the camera transmits or receives images and/or audio when an external device is determined to be connected.

14 Claims, 14 Drawing Sheets

U.S. PATENT DOCUMENTS

| | | | |
|---|---|---|---|
| 4,531,161 A | 7/1985 | Murakoshi | |
| 4,746,993 A | 5/1988 | Tada | |
| 5,032,918 A | 7/1991 | Ota et al. | |
| 5,034,804 A | 7/1991 | Sasaki et al. | |
| 5,062,010 A | 10/1991 | Saito | |
| 5,099,262 A | 3/1992 | Tanaka et al. | |
| 5,111,299 A | 5/1992 | Aoki et al. | |
| 5,138,459 A | 8/1992 | Roberts et al. | |
| 5,146,353 A | 9/1992 | Isoguchi et al. | |
| 5,231,501 A | 7/1993 | Sakai | |
| 5,295,077 A | 3/1994 | Fukuoka | |
| 5,343,243 A | 8/1994 | Maeda | |
| 5,367,332 A | 11/1994 | Kerns et al. | |
| 5,414,464 A | 5/1995 | Sasaki | |
| 5,436,657 A | 7/1995 | Fukuoka | |
| 5,473,370 A | 12/1995 | Moronaga et al. | |
| 5,475,441 A * | 12/1995 | Parulski et al. | 348/552 |
| 5,479,206 A | 12/1995 | Ueno et al. | |
| 5,506,617 A | 4/1996 | Parulski et al. | |
| 5,534,921 A * | 7/1996 | Sawanobori | 348/333.01 |
| 5,535,011 A | 7/1996 | Yamagami et al. | |
| 5,539,535 A | 7/1996 | Aizawa et al. | |
| 5,568,198 A | 10/1996 | Sakurai et al. | |
| 5,608,490 A * | 3/1997 | Ogawa | 396/300 |
| 5,640,203 A | 6/1997 | Wakui | |
| 5,648,816 A | 7/1997 | Wakui | |
| 5,699,173 A | 12/1997 | Aizawa et al. | |
| 5,717,496 A | 2/1998 | Satoh et al. | |
| 5,790,274 A | 8/1998 | Aizawa et al. | |
| 5,793,517 A | 8/1998 | Aizawa et al. | |
| 5,801,847 A | 9/1998 | Aizawa et al. | |
| 5,815,201 A | 9/1998 | Hashimoto et al. | |
| 5,815,205 A | 9/1998 | Hashimoto et al. | |
| 5,903,700 A * | 5/1999 | Fukushima | 386/46 |
| 5,914,787 A | 6/1999 | Satoh et al. | |
| 6,081,350 A | 6/2000 | Aizawa et al. | |
| 6,104,430 A * | 8/2000 | Fukuoka | 348/231.6 |
| 6,111,604 A * | 8/2000 | Hashimoto et al. | 348/220.1 |
| 6,111,662 A | 8/2000 | Satoh et al. | |
| 6,151,067 A | 11/2000 | Suemoto et al. | |
| 6,583,893 B1 | 6/2003 | Satoh et al. | |
| 6,677,989 B1 | 1/2004 | Aizawa et al. | |
| 7,046,276 B2 * | 5/2006 | Hashimoto et al. | 348/220.1 |

FOREIGN PATENT DOCUMENTS

| | | | |
|---|---|---|---|
| JP | 3-268583 | | 11/1991 |
| JP | 4-980 | | 1/1992 |
| JP | 4-298171 | | 10/1992 |
| JP | 5-167979 | | 7/1993 |
| JP | 06-164669 | | 6/1994 |
| JP | 06-252803 | | 9/1994 |
| JP | 6-284368 | | 10/1994 |
| JP | 06284368 A | * | 10/1994 |
| JP | 6-350886 | | 12/1994 |
| JP | 06350886 A | * | 12/1994 |

OTHER PUBLICATIONS

Ricoh DC-1, Brochure, May 1995, pp. 1/8-8/8, "Multimedia-Adapted Digital Camera Ricoh DC-1", (with English Translation).

Control Technology and Personal Computers, System Design and Implementation, Michael F. Hordeski, pp. 201-202, 1992.

Apple QuickTake 150, User's Guide for Macintosh, Chapter 1, pp. 2-4; and Chapter 3, pp. 23-24, 26-27, and 30-41.

User's Manual, Kodak Professional DCS 200 Digital Camera, Chapters 4, pp. 4-1 to 4-51; and Chapters 5, pp. 5-1 to 5-38.

Japanese Office Action for Japanese Patent Application No. 07-032589, dated Dec. 16, 2003 (with English Translation).

Japanese Office Action for Japanese Patent Application No. 07-032589, dated Aug. 31, 2004 (with English Translation).

* cited by examiner

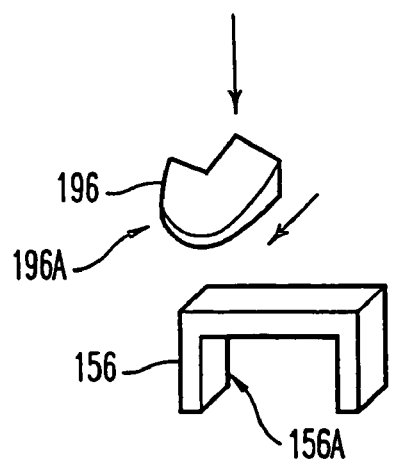
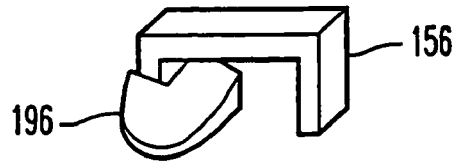
*FIG. 5A*     *FIG. 5B*
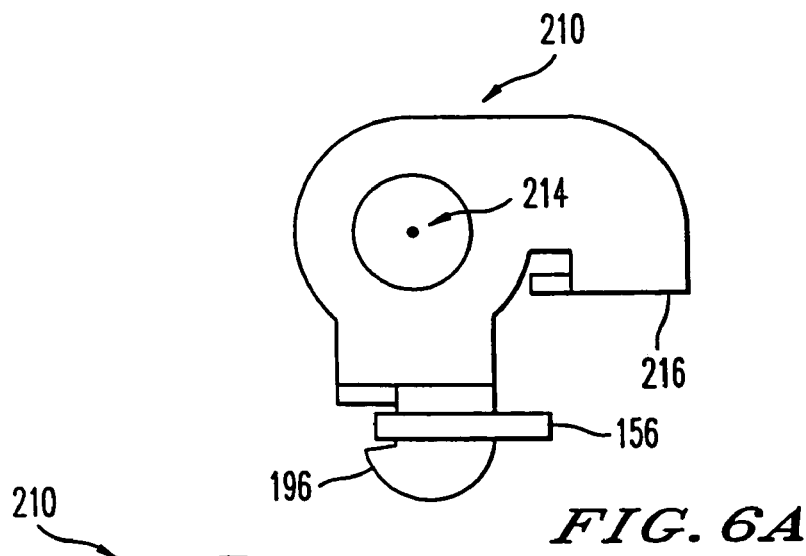
*FIG. 6A*
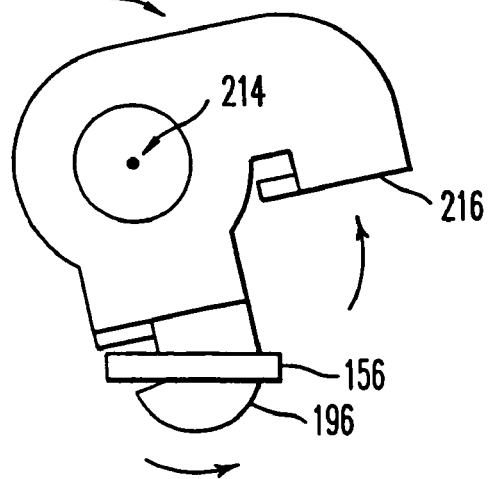
*FIG. 6B*

DIGITAL CAMERA WHICH DETECTS A CONNECTION TO AN EXTERNAL DEVICE

CROSS-REFERENCES TO RELATED APPLICATIONS

This application is related to commonly owned co-pending U.S. patent application Ser. No. 08/535,378 entitled "Digital Electronic Camera Having an External Input/Output Interface Through Which the Camera is Monitored and Controlled" and U.S. patent application Ser. No. 08/535,562 entitled "A Digital Electronic Still Camera Which Receives an Input/Output Control Program Through a Detachable Communication Interface Card", both of which were filed on Sep. 28, 1995 and are incorporated herein by reference. This application is also related to commonly owned co-pending U.S. patent application Ser. No. 08/603,583 entitled "Method and System for Reading and Assembling Audio and Image Information for Transfer Out of a Digital Camera", and Ser. No. 08/603,551 entitled "External Communication Interface for a Digital Camera", each concurrently filed with the present application and incorporated herein by reference.

BACKGROUND OF THE INVENTION

1. Field of the Invention

The present invention relates to a digital electronic camera and the interfacing of the camera to an external processing device which monitors, receives images and/or audio, and/or controls the camera through an input/output interface. The invention is more particularly related to a digital electronic camera which automatically detects a connection to the external processing device.

2. Discussion of the Background

Conventional cameras which use light sensitive film have been known for a long time and the manner of generating images is well-known; light sensitive photographic film is exposed to light which passes through a lens and a shutter. The film is then taken to a developing center and processed into photographic prints.

Digital electronic cameras which electronically capture images or images along with audio are also known. However, this field of technology is relatively new and there is not a universal standard for exporting or producing images from digital cameras. When designing the camera corresponding to the present invention, the inventors have discovered various problems in communicating information out of the camera. These problems include the connection of the camera to an external device such as another camera or a general purpose computer. The present inventors have sought to overcome problems pertaining to the actual connection of the camera to the external device, the conversion of signal levels from a level used by the processor within the camera to a level compatible with a communication interface, the detection of a connection of the camera to the external device, and the manner of assembling the information to be transmitted.

SUMMARY OF THE INVENTION

Accordingly, one object of the present invention is to provide an electronic camera capable of detecting that there is a proper connection and communication with an external device such as a computer. It is a further object of the invention for the camera to transmit and receive images and/or audio from the external device after the connection has been established. It is yet another object of the invention to provide an electronic camera which operates without utilizing an electrical-mechanical switch for placing the camera in a communication mode. It is yet another object of the invention to provide an electronic camera which operates using a single switch to control both whether the camera plays images and records images when the external device is not detected to be connected, and which also controls whether the camera transmits or receives images when the external device is determined to be properly connected to the camera.

These and other objects are accomplished by an electronic camera for connection to an external device such as a personal computer. The electronic camera periodically checks, for example, every one-half to one second, whether the camera is connected to the external device and also whether the external device is in a state which permits communication. After it is determined that there is a proper connection and the external device is in a state which permits communication, there is a communication between the electronic camera and the external device of images and/or audio.

Preferably, the camera detects proper connection to the external device and that the external device is in a state which permits communication by monitoring a data terminal ready (DTR) signal of an RS-232 connection. This DTR signal will indicate both that the external device is properly connected and ready to communicate.

In an embodiment of the invention, the camera includes a single switch for both controlling whether the camera captures images through the lens or plays images back to the user on a video screen, and whether the camera is to transmit or receive images and/or audio or transmit the images and/or audio when the external device is detected to be connected and capable of communicating. By detecting that the external device is capable of communicating, it is possible to eliminate a separate switch which places the camera in a communication mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A illustrates the manner of inserting a latch 196 of the pivoting latch member into a receiving member;

FIG. 5B illustrates the latch 196 after being inserted through and latched to the receiving member;

FIG. 6A illustrates a top view of the latch locked into the receiving member;

FIG. 6B illustrates the pivoting latch member in a release position in which the pivoting latch member has rotated about pivot point 214;

DESCRIPTION OF THE PREFERRED EMBODIMENTS

Figure 1A:
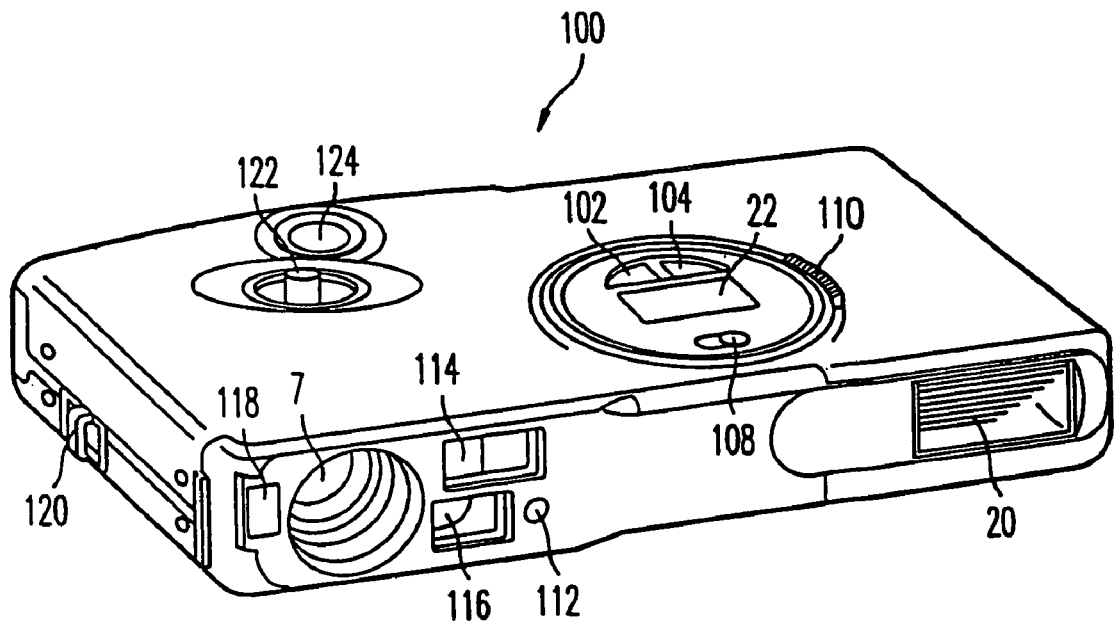
FIG. 1A illustrates a perspective view of the front and top of a digital camera according to the present invention.

Referring now to the drawings wherein like reference numerals designate identical or corresponding parts throughout the several views, and more particularly to FIG. 1A thereof, a perspective view showing the front and top of a digital electronic camera according to the present invention is illustrated. The camera, referred to as a digital camera or electronic camera, captures images and/or audio and writes this information into a memory in digital form. The use of photographic film is not necessary and the camera may capture a series of consecutive still images to provide video with movement or motion. The camera 100 illustrated in FIG. 1A contains a button 102 for turning the flash 20 on and off and changing the flash mode, a button 104 for setting the recording mode such as whether audio is to be captured, whether a series of consecutive images are to be captured, etc. A display 22 is a LCD display which displays the state and settings of the camera such as the flash mode, record mode, battery state, number of images taken and other features of the camera. Switch 108 is used to set the self timer and switch 110 is used to turn the camera off and on and also sets whether the record mode or play mode is to be used. This switch in one embodiment is also used to set whether the camera will be in a transmit or receive mode when connected to an external device. There is a red LED 112 which indicates that an image is being recorded or that the self timer is operating. The windows designated by 114 are used to perform automatic focusing and the viewfinder window is designated by 116. Images are captured through the lens 7, and there is a window 118 for receiving commands from an infrared remote control (not illustrated) which can be used to instruct the camera to capture images and/or audio and also control the functions of the camera. There is also a clip 120 which holds a camera strap. A slidable lever 122 is used to zoom the lens and the camera also includes a shutter release button 124.

Figure 1B:
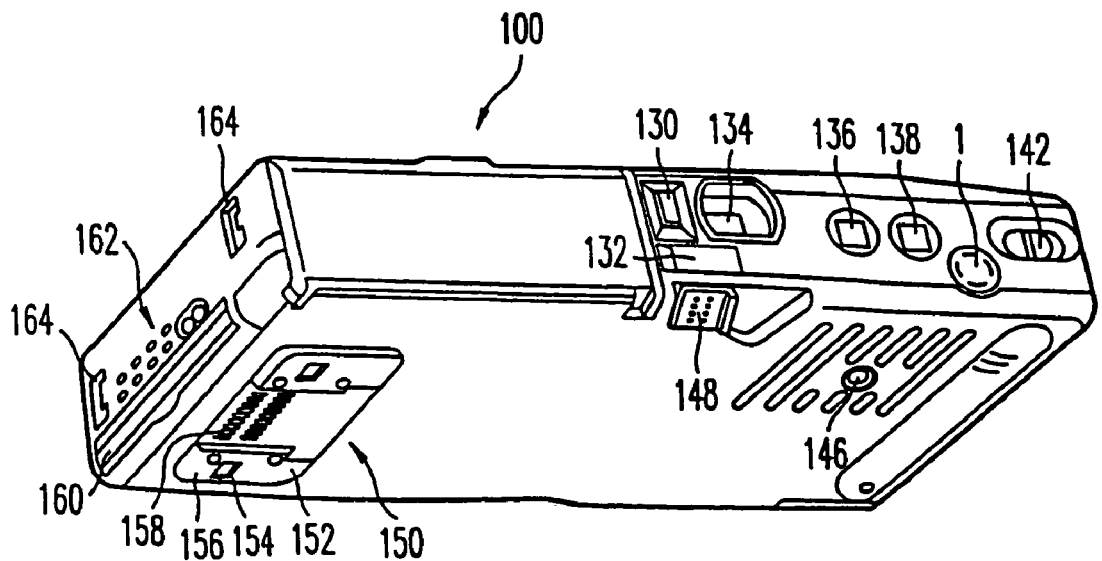
FIG. 1B illustrates another perspective view of the digital camera of FIG. 1A viewed from the bottom and rear.

FIG. 1B illustrates a perspective view of the bottom and back of the camera 100. There is knob 130 to adjust the visibility, a cover 132 which covers an opening for a small button type battery used to maintain the setting of parameters in memory, a view finder 134, a date button 136 and time button 138 which controls the operation of the date and time functions of the camera, a microphone 140, and a switch 142 for controlling the image quality or resolution. There is a hole 146 for receiving a bolt from a tripod, and a lever 148 for releasing memory or I/O cards from the camera body through the slot 160.

The camera according to the present invention allows images and audio in a digital format to be transmitted from and received by the camera to and from an external communication interface which connects to a connecting portion 150 of the camera. The connecting portion 150 includes concave protrusions 152, each protrusion having a hole 154. Within each hole is a receiving member 156 which, due to its position within the hole 154, cannot be seen in FIG. 1B and is more clearly illustrated in FIGS. 5A and 5B which are described below. These receiving members 156 are metal and also serve to provide grounding connections between the camera and the external communication interface. There are also electrical contacts 158 which allow an electrical connection between the camera 100 and an external communication interface. Because of the existence of the slots 160 for receiving various types of cards (e.g., memory or communication PCMCIA cards) there is very little depth for the connection portion 150. This requirement resulted in the design of a novel connection mechanism described in further detail below. Additionally, a conductive ribbon cable which is thin and flexible is used to feed power and receive and transmit signals through the contacts 158.

The camera also includes contacts 162 on the side of the camera and connectors 164 which allow connection of a video display and a speaker to display images and audio generated by the camera.

Figure 2A:
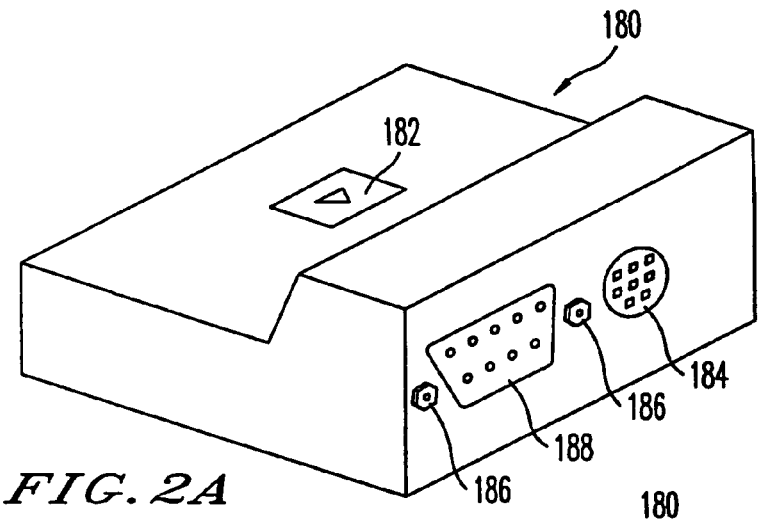
FIGS. 2A-2C illustrate perspective views of an external communication interface of the camera.
Figure 2B:
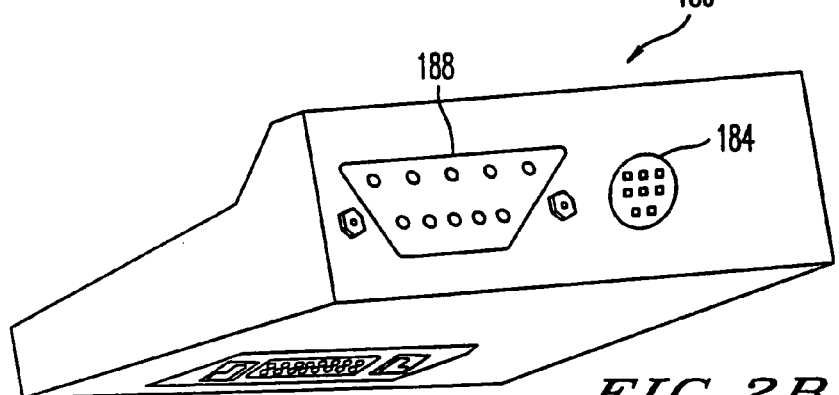
Figure 2C:
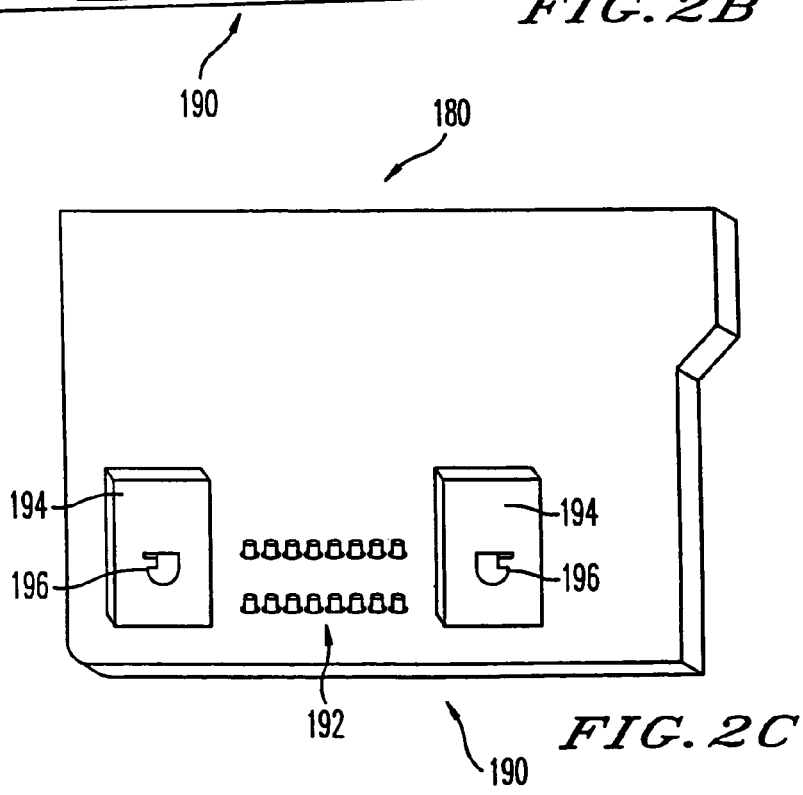

FIGS. 2A-2C illustrate perspective views of an external communication interface 180. The interface 180 includes, as illustrated in FIG. 2A, a sliding release button 182, a DIN 8 pin RS-422 interface for connection to a modem port of a Macintosh computer and a 9 pin D connector 188 which communicates according to the RS-232 format to an IBM compatible personal computer. Images and/or audio are communicated between the connected computer and camera in either direction. The interface 180 also includes nuts 186 for receiving screws from a pin connector which plugs into the D-9 pin connector 188. FIG. 2B is a perspective view showing the underside of the communication interface 180 which connects to the camera 100. A clearer view of this connection portion 190 is seen in FIG. 2C.

The connection portion 190 includes convex indentations 194 which match with the concave protrusions 152 of the camera. The convex indentations 194 include pivoting latches 196 which latch with the receiving member 156. The communication interface also includes pins 192 which correspond to the contacts 158 of the camera.

Figure 3A:
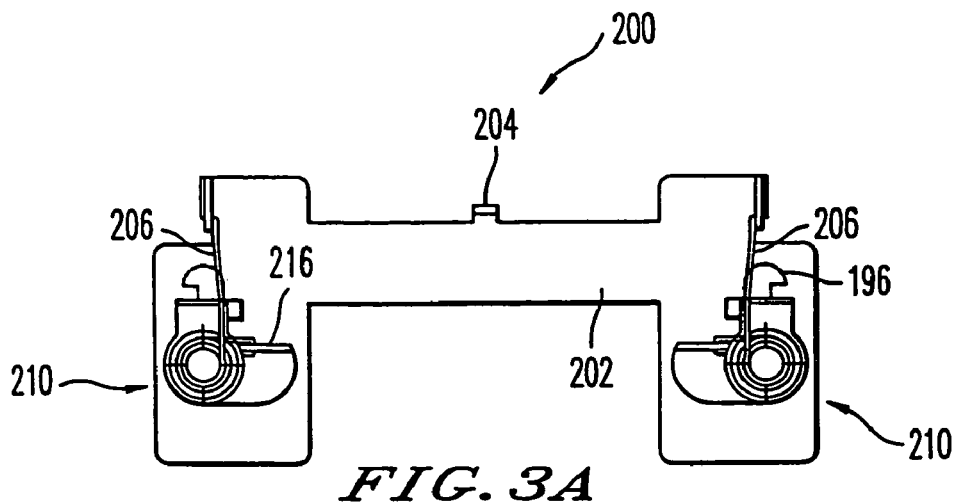
FIG. 3A illustrates a top view of a latching mechanism of the external communication interface.
Figure 7:
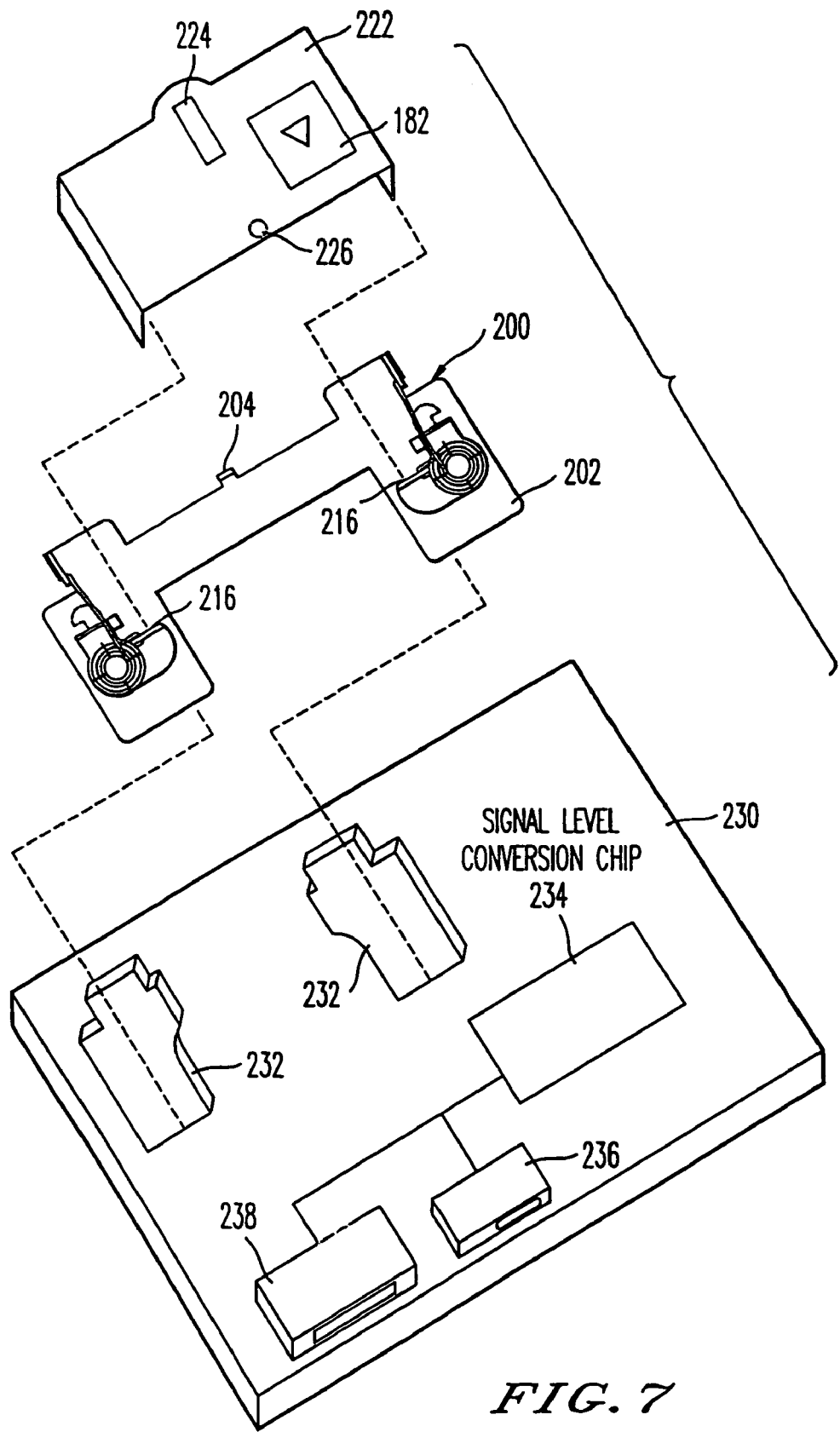
FIG. 7 is an exploded view of the internal components of the external communication interface.

FIG. 3A illustrates a latching mechanism 200 located within the external communication interface 180 which is used to connect the external communication interface 180 to the camera 100. The latching mechanism 200 includes a frame 202. On the frame is mounted a spring connector 204 which is used to mount a spring which is connected to a sliding release unit which is illustrated in FIG. 7. There is a pivoting latch member 210 which includes the latch 196 and is resiliently held in place via a spring 206.

Figure 3B:
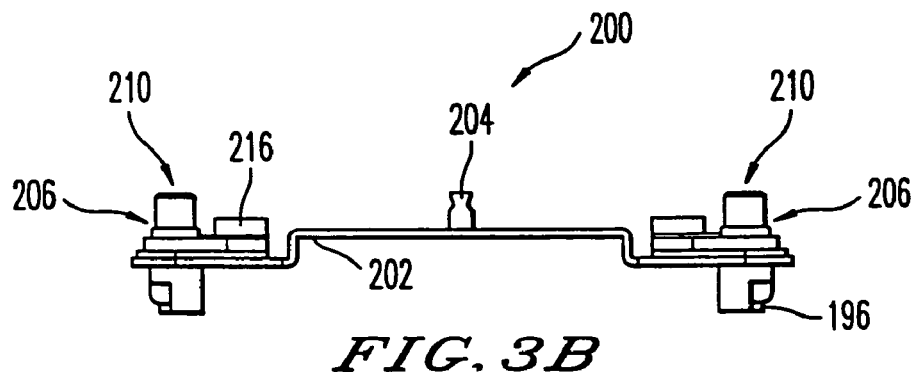
FIG. 3B illustrates a cross-sectional view of the latching mechanism of the external communication interface.

FIG. 3B is a cross-sectional view of the latching mechanism 200 illustrated in FIG. 3A. In this figure, it is seen that the frame 202 is not planar but has the center portion thereof raised above a level of the region supporting the pivoting latch member 210. This allows the latching mechanism 200 to be mounted to a board, for example a printed circuit board, having holes to accommodate the end regions of the frame. Only the center region of the frame is mounted on the printed circuit board.

Figure 4A:
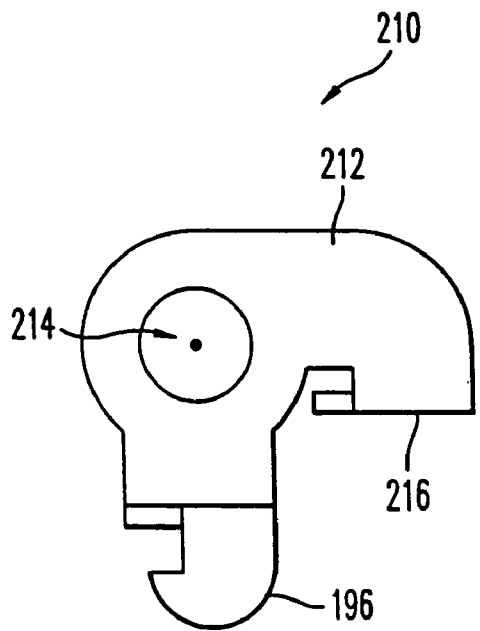
FIG. 4A illustrates a view from the top of a pivoting latch member of the latching mechanism.
Figure 4B:
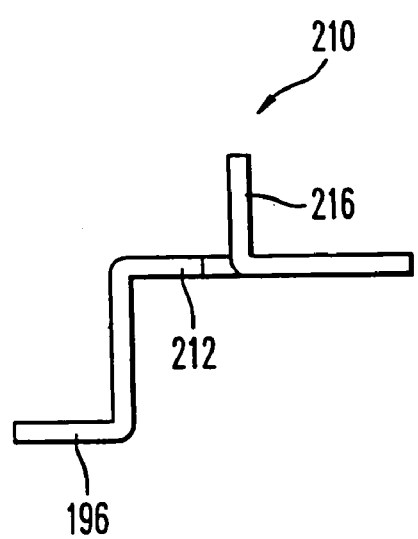
FIG. 4B illustrates a cross-sectional view of the pivoting latch member.

FIG. 4A is a top view of the pivoting latch member 210. The pivoting latch member 210 contains a body 212 which is pivotally mounted at a pivot point 214. Connected to the body 212 is the latch 196 and a pressing surface 216. FIG. 4B is a cross-sectional view of the pivoting latch member 210. This figure clearly shows that the latch 196 is at a level below the level of the body 212. This allows the latch 196 to be inserted into the hole 154 of the camera. Further, the level of the pressing surface 216 is shown to be above the level of the body 212 of the pivoting latch member.

FIGS. 5A and 5B are a perspective view of the operation of connecting the latch 196 of the external communication interface 180 to the receiving member 156 of the connecting portion of the camera. In FIG. 5A, first the latch 196 is pushed downwardly to the level of the receiving member 156. Next, the latch 196 is pushed through the receiving member 156 in order to engage with the receiving member 156 as illustrated in FIG. 5B. Referring to FIG. 5A, as the latch 196 is pushed forward through the receiving member 156, the surface 196A of the latch 196 contacts the surface 156A of the receiving member 156. The rounded surface 196A of the latch 196 causes the latch 196 to pivot and then engage with the receiving member 156, as illustrated in FIG. 5B.

FIGS. 6A and 6B are a top view of the interaction of the pivoting latch member 210 with the receiving member 156. In FIG. 6A, the pivoting latch member 210 is engaged with the receiving member 156 and corresponds to the perspective view illustrated in FIG. 5B. In order to release the latch 196 from the receiving member 156, a force is applied against the pressing surface 216 which pivots the latch member 196 so that the latch member 196 and the entire external communication interface can be slid back so that the latch 196 is no longer under the receiving member 156. Then, the latch 196 along with the entire external communication interface can be separated from the camera by moving the external communication interface away from the camera.

FIG. 7 is an exploded view of the internal components of the external communication interface 180. There is a sliding release unit 222 having ends which engage with the pressing surfaces 216 of the pivoting latch member 210. The exact position of the sliding release button 182 illustrated in FIG. 2A can be seen in FIG. 7. There is a groove 224 in the sliding release unit 222 which mates with and receives the spring connector 204. The spring connector 204 slides along this groove 224. There is also a spring connector 226 on the latching mechanism 222. A spring (not illustrated) connects to the spring connector 204 and the spring connector 226. This keeps the sliding release unit 222 biased away from the pressing surfaces 216. In order to operate the release mechanism, the sliding release unit is pushed towards the pressing surfaces 216 in the direction of the arrow on the sliding release button 182 which causes the latches 196 to pivot inwardly or towards each other.

The frame 202 of the latching mechanism spans the two holes 232 in a printed circuit board 230. Due to the offset levels of the frame 202, the ends of the frame containing the pivoting latch members 210 fit within the holes 232. Mounted on the printed circuit board 230 is a signal level conversion chip 234 which is described in detail below. Connected to the signal level conversion chip 234 are the 8 pin RS-422 connector 236 and the 9 pin D connector for RS-232 signals.

Figure 8:
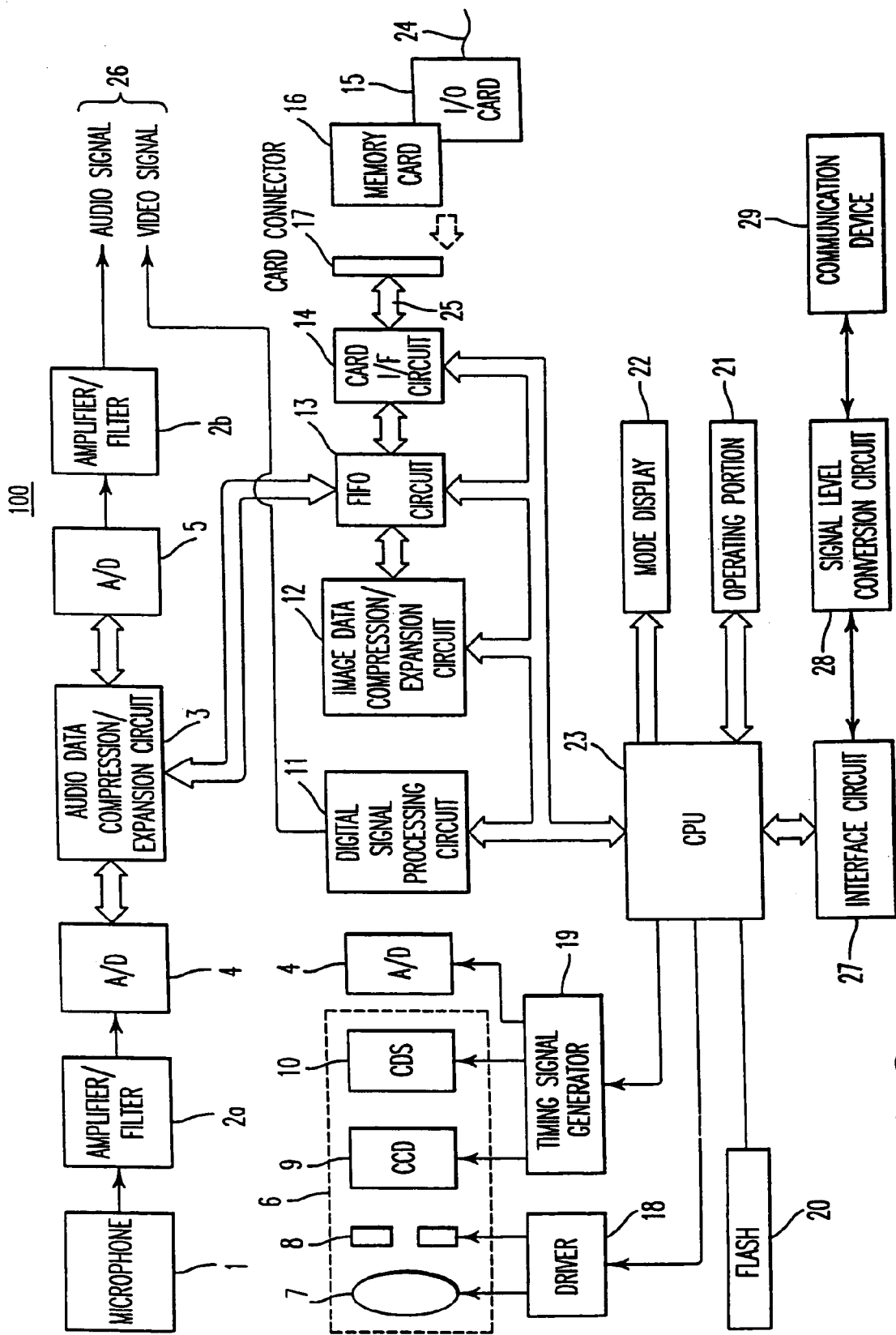
FIG. 8 is a functional block diagram of the electrical aspects of the digital camera.

FIG. 8 is a block diagram showing the details of the construction of the camera 100. The microphone 1 is connected to an amplifier/filter 2a, which outputs a signal to an analog-to-digital converter 4. The amplifier/filter 2a reduces the audio signal to the appropriate bandwidth. The analog-to-digital converter 4 operates with an optimum sampling frequency, for instance, at a frequency which is an integer-times of the sub-carrier frequency of an NTSC signal used by the camera. Further, a sampling frequency of the A/D converter 4 is more than two times the necessary bandwidth. An audio data compression/expansion circuit 3 is used to encode and decode audio signals using known methods of audio encoding such as linear PCM, Dolby AC-3, or MPEG-2 audio encoding. The compressed audio signals are transmitted to a conventional FIFO circuit 13 which functions as a memory and alternatively can be a DRAM. The FIFO circuit 13 includes a section for images and a section for audio. Unencoded digital audio signals from the compression/expansion circuit 3 are transmitted to a digital-to-analog converter 5 and subsequently amplified and filtered by the amplifier/filter 2b. The audio signals included in the signals 26 are then output to a suitable audio generator such as a speaker 32.

An image photographing section 6 of the camera includes a photographing lens 7, a lens opening 8, an image photographing element 9 such as a CCD (charge coupled device) or a MOS-type image photographing element. The CCD 9 in the preferred embodiment has a resolution of 768×480 (horizontal×vertical). The output of the CCD 9 is transmitted to a circuit 10 which eliminates noise from the analog signal output by the CCD 9. This may be accomplished by a correlative doubled sampler (CDS). The out put image signal from the image photographing portion 6 is transferred to an analog-to-digital converter 4 which transmits a digital image signal to a digital signal processing circuit 11 which, for example, performs ordinary and known treatment of the image signal including gamma-compensation, color separation, and generates the luminance signal Y, and color difference signals Cb and Cr in a known manner. An example of the performance of these functions is disclosed in U.S. Pat. No. 5,343,243, which is incorporated herein by reference. Video signals (either analog or digital) are output from the digital signal processing circuit 11 as a video signal 26 which is displayed by a display such as a color LCD panel.

An image data compression/expansion circuit 12 is used to encode and decode the images using known image compression methods which transform the images into and out of compressed formats such as GIFF, JPEG, MPEG or any other known image compression method. Details of image compression which may be used by the camera 100 are disclosed in U.S. Pat. No. 5,414,464 which is incorporated herein by reference. A card interface circuit 14 is connected to the card connector 17 through the card interface bus 25. The card interface circuit 14 controls communications between the camera and the plug-in communication cards which for example may function as a LAN card, a modem card either for a conventional wired telephone system or a cellular phone, a Small Computer System Interface (SCSI) interface, a serial port, an ISDN interface, or any other type of communication device. From interface circuit 14, images and audio are output to memory card 16 or I/O card 15. The I/O card includes a cable 24 for connecting to an external device. Also, images may also be transferred to interface circuit 14 from cards 15 or 16.

A Central Processing Unit 23 (CPU) controls the operation of the camera and is connected to a mode display 22 which displays various operating parameters of the camera including modes which have been set and operating parameters of the camera. The mode display 22 may be an LCD or LED display. An operating portion 21 through which the user inputs commands such as the command to take a picture when the shutter button is pressed, whether sound is recorded, whether still images or a series of still images forming moving images are recorded, and all other operations of the cameras. A flash 20 which is powered by batteries (not illustrated) is connected to the CPU 23 and is used to illuminate the scene to be photographed. There is a driver 18 which drives a mechanical system of the image photographing portion 6 and performs functions such as focusing and zooming of the lens. The timing signal generator 19 generates various timing signals as images are captured such as a vertical synchronizing signal, a horizontal synchronizing signal, and a CCD synchronizing signal.

Compressed images which are stored in the memory card 16 may be read out of the memory card 16 through the card interface circuit 14 and stored in the FIFO circuit 13. The compressed images are subsequently transferred to the image data compression/expansion circuit 12 which decodes or expands the compressed image signals and transfers the signals to the digital signal processing circuit 11. In the digital signal processing circuit, the luminance and color difference signals are transformed to a NTSC signal and output as a video signal.

Compressed audio information is similarly read out of the memory card 16 and written into the FIFO circuit 13. The encoded audio signals are transferred to the audio data compression/expansion circuit 3 where they are converted to an uncompressed digital form, converted to an analog form by the digital-to-analog converter 5, and amplified and filtered by the amplifier filter 2b. The converted signal is output as the audio signal.

The digital images captured by the camera are used to create exposure controlling evaluation information, automatic focus controlling information, and automatic white balance evaluation information by the CPU 23. Automatic control of the camera is performed using this information. Additionally, this and all other evaluation data, control data, status data, etc., can be output through or stored in the I/O card 15 or stored in the memory card 16. This information may be used, for example, when monitoring the camera in order to determine if an abnormal state exists. Further, the quality of the image can be optimized by changing the number of pixels used to represent an image.

The CPU 23 also performs a clock function for recording the date and time of when the audio and video has been captured. Additionally, a field number may be added to the image data by the CPU 23. Each of the image data, audio data, date, time, and field number may be output through the card interface circuit 14 to either the memory card 16, I/O card 15, or an interface circuit 27 which is an alternative device to the I/O card 15 for communicating.

The interface circuit 27 converts signals which are communicated to an appropriate standard. For example, the camera according to the present invention can communicate according to the RS-232 standard or the RS-422 standard. The interface circuit 27 is the structure which changes the signals to the appropriate format. During operation, the user of the camera will select the desired communication format (e.g., RS-232 for IBM PC compatibles and RS-422 for Macintosh computers). Both the RS-232 and RS-422 are well known standards and one of ordinary skill in the art would know how to build the appropriate circuitry to generate signals according to the appropriate standard. For example, see e.g., "Control Technology and Personal Computers, System Design and Implementation", by Hordeski, 1992, published by Van. Nostrand Reinhold, which discusses a single I/O expansion board which can transmit information according to either the RS-232 or RS-422 standards, depending on the user's desires, which is incorporated herein by reference.

Signals within the CPU will generally have a voltage range of 0 to +5 volts whereas bipolar signals in the range of approximately −15 volts to +15 volts are used with the RS-232 standard. The signal level conversion circuit 28 functions to convert the signal to the appropriate levels and is preferably contained within the signal level conversion chip 234 of the external communication interface 180. A more detailed description of the circuit is explained with respect to FIG. 17. There is a communication device 29 such as a personal computer, modem, or another camera, for example, connected to the signal level conversion circuit 28. This communication device 29 exchanges digital files containing video and/or audio information. The camera can both export and import audiovisual information.

In FIG. 8, the FIFO circuit or memory 13 is illustrated as being connected to each of the audio data compression/expansion circuit 3, the image data compression/expansion circuit 12, the card I/F circuit 14, and the CPU 23, as an alternative, the FIFO circuit or memory 13 may be directly connected between the card interface circuit 14 and the CPU 23. In this case, the audio data compression/expansion circuit 3 is connected to the card interface circuit 14 instead of being directly connected to the FIFO circuit 13. Further, as an alternative to any use of a FIFO circuit 13, a DRAM, an SRAM, or any other desired memory can be used.

Figure 9:
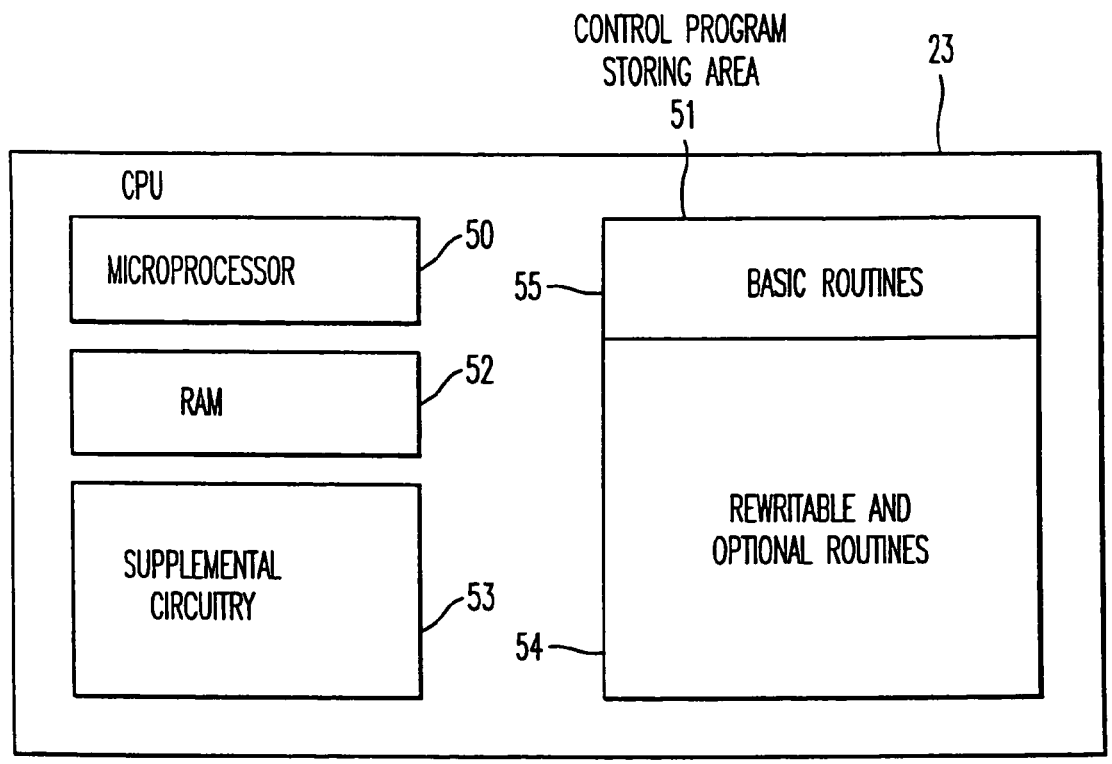
FIG. 9 illustrates the details of the CPU 23 of the camera.

Details of the CPU 23 are illustrated in FIG. 9. In FIG. 9, the CPU 23 contains a microprocessor 50, RAM 52 for storing various information and serves as a working memory area as calculations and functions are being performed, and a control program storing area 51. The control program storing area 51 includes a section 55 for storing basic routines such as BIOS (Basic Input Output System) routines, and other routines used by the system. The basic routines 55 are stored in a non-volatile memory such as a flash memory, an EPROM, or other type of memory. There is a section of the control program storing area 51 which stores rewritable and optional routines which may be loaded in from the memory card 16 and the I/O card 15. Section 54 may be constructed using the same flash memory as stores the basic routines 55 or may be a separate memory. In order to reduce the size of the chip and reduce the cost of the chip which may be used as the CPU 23, it is desirable to use a flash memory to store the basic routines 55 and the rewritable and optional routines 54. The CPU 23 may either be a single chip or be composed of multiple components. By having a section for rewritable and optional routines, the camera becomes very flexible by allowing the camera to be programmed as desired and there is no need to store routines which are not going to be used. This rewritable and optional routines section is especially useful for the process of inputting and outputting information as there are many different communication protocols which may be used. The control program storing area 51 stores routines which control the fundamental functions of the camera and other functions such as reading out program data, changing parameters within the camera, writing data into the rewritable and optional routines section 54, and any other function of the camera. Supplemental circuitry 53 performs functions which are necessary for the CPU and includes a bus controller, a serial communication controller, an interrupt controller and analog-to-digital converter for monitoring analog signals, and a clock for keeping track of the time and date.

Figure 10:
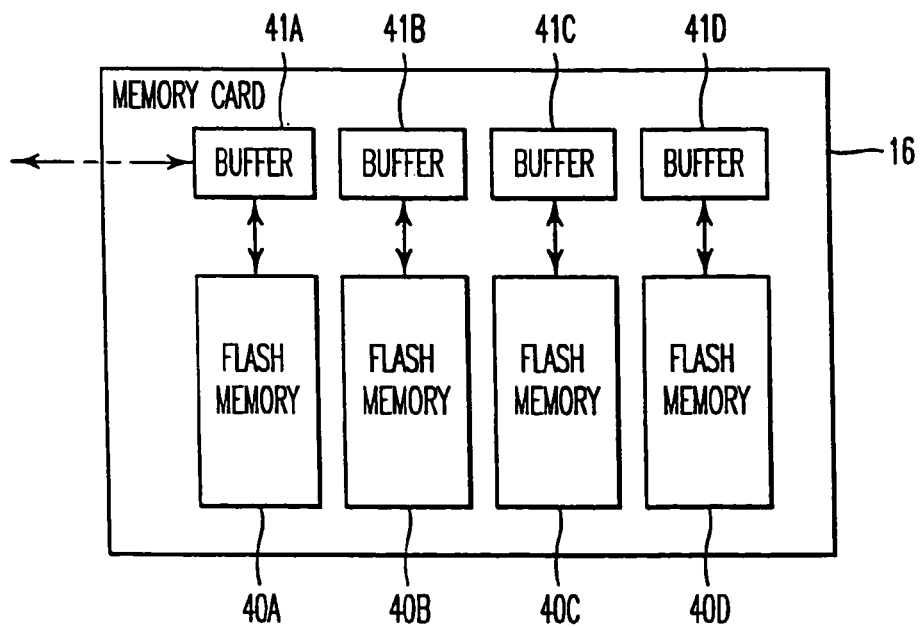
FIG. 10, illustrates a functional block diagram of the memory card 16 employing four flash memories.

FIG. 10 illustrates a possible structure for the memory card 16. In this example, the memory card includes four buffers 41A-41D which are respectively connected to four flash memories 40A-40D. The buffers 41 may be implemented using 256 byte SRAMs and the flash memories implemented each using a 16 Mbit flash memory. The flash memories may be conventional and can be NAND type flash memories available from Toshiba. Alternatively, the memories can be a NOR type flash memory available from Intel. The memory card 16 is connected to the card connector 17 through an eight bit data bus.

The buffers 41 are relatively high speed buffers whereas the flash memories 40 are relatively slow memories. The high speed buffers 41 may operate as burst transfer memories. During operation, information is transferred to the buffer memories and subsequently transferred to the corresponding flash memory in groups of 256 bytes. Accordingly, a plurality of transfer operation will usually be needed to transfer the desired material into or out of the memory card 16. The number of transfers between the buffers 41 and the FIFO circuit 13, for example, is set to be an integral multiple of a transfer size of the memory card. It is also possible for the number of transfers to be the amount of information to be transferred divided by the total size of the buffers 41, rounded up to the nearest integer. As an alternative to flash memories, the memories 40 can be implemented using EPPROMs.

Figure 11:
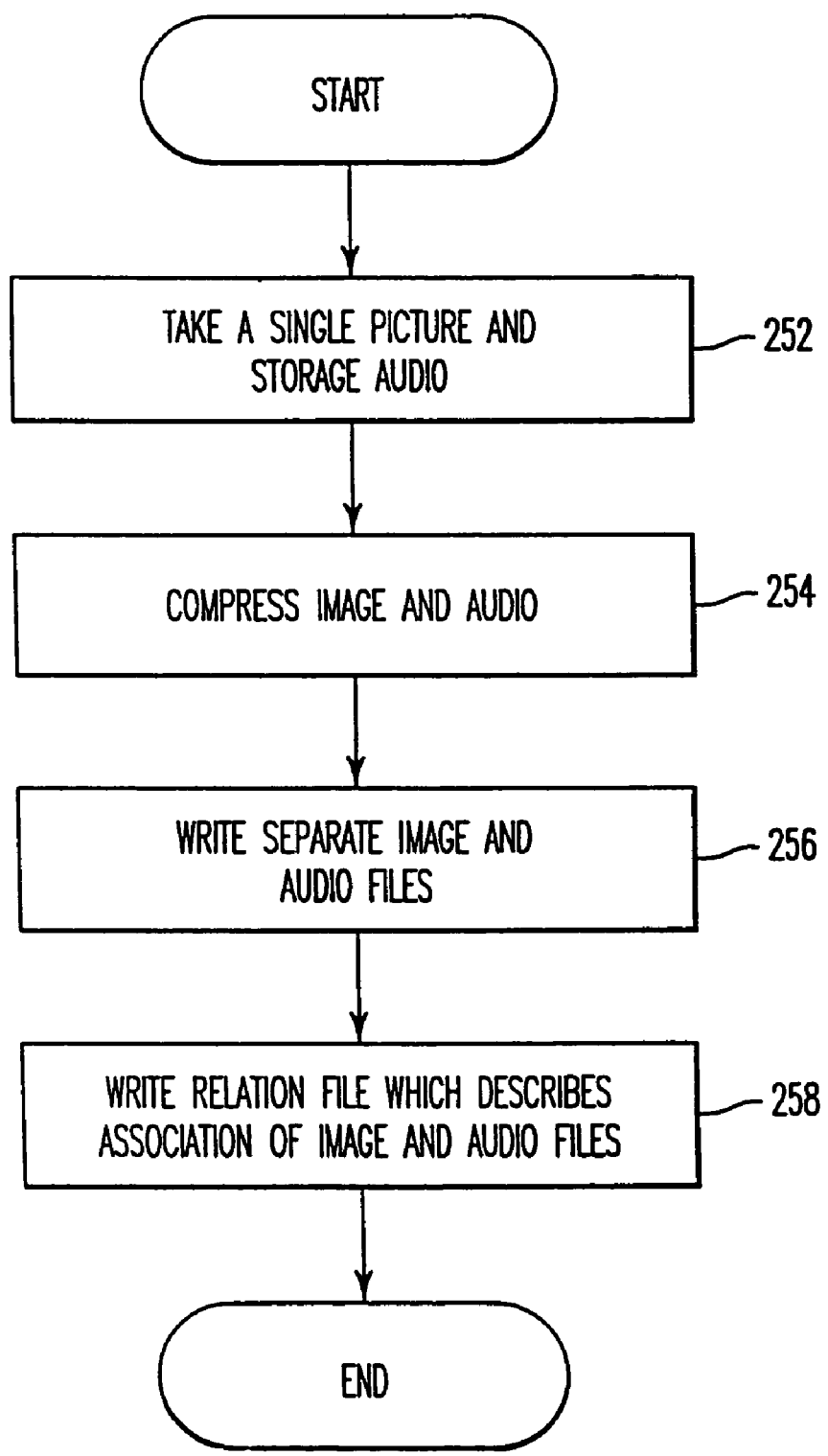
FIG. 11 is a flowchart illustrating the process of capturing an image and audio by the camera.

FIG. 11 illustrates a process for capturing and storing video and audio information. After starting, the user presses the shutter release button 124 and a single picture along with associated audio is captured and stored in step 252. Step 254 then compresses the image and audio. Separate image and audio files are then written into the memory card 16 in step 256. Subsequently, a relation file which describes the association of the image and audio files is written or updated in step 258. The process of FIG. 11 then ends.

Figure 12:
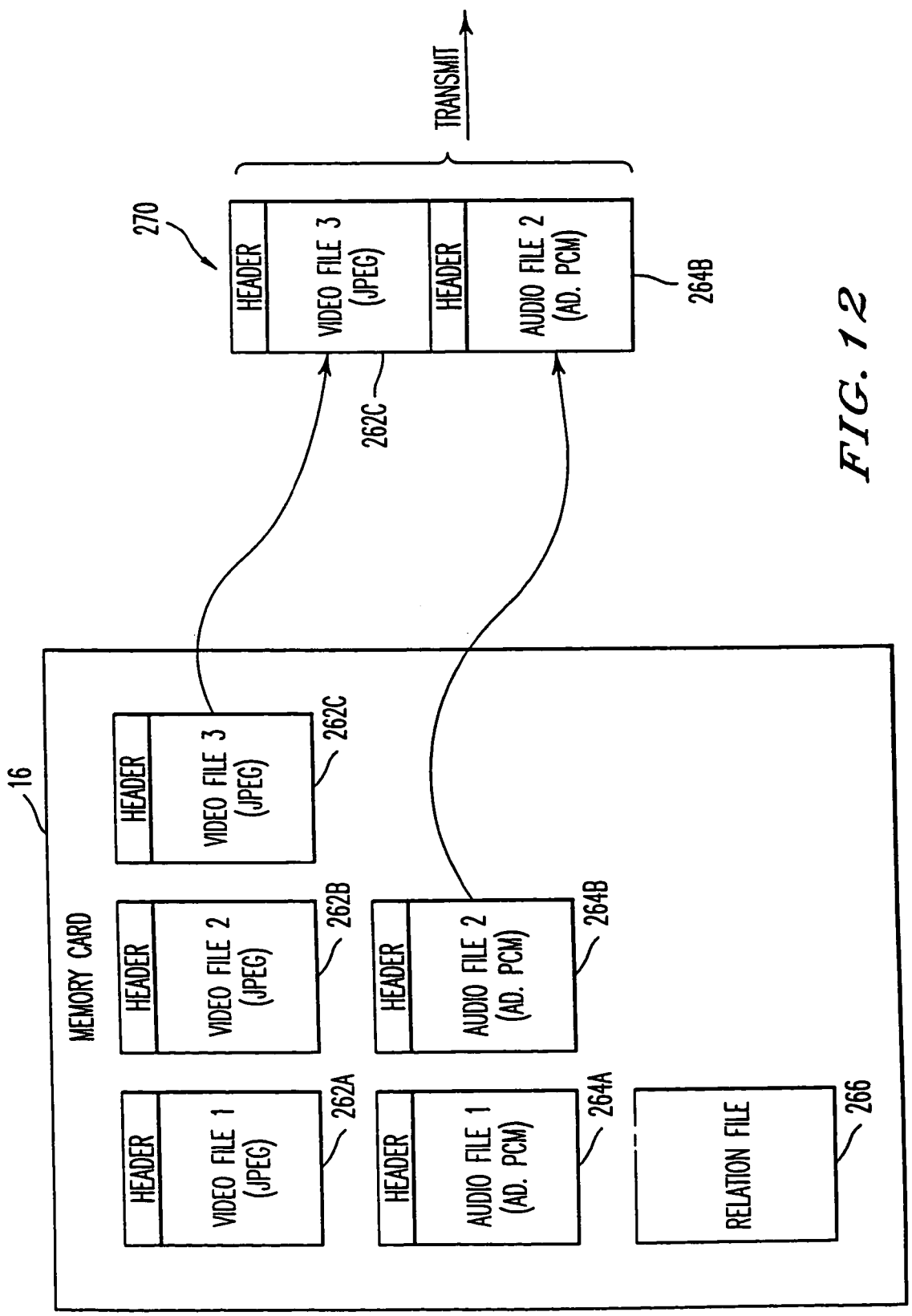
FIG. 12 illustrates the manner of storing files within the memory card 16 and the format of information to be transmitted out of the camera.

An example of the organization of files is illustrated on the left side of FIG. 12. The left side of this file illustrates memory card 16 having three video files 262A-262C, each having a header. The video files are stored in a compressed form such as according to the JPEG format. There are also two audio files 264A and 264B each containing headers and having been encoded using adaptive pulse coded modulation (PCM). A relation file 266 describes the correspondence between the video and audio files. For example, video file three 262C contains one image and corresponds with the audio in audio file two 264B and the relation file 266 describes this correspondence. The relation file 266 may also function as a directory of information within the memory card 16. The relation file can indicate information of just a still image, the combination of a still image with audio data, and information of a successive images so that a series of images can be displayed to generate moving images. Further, if desired, the relation file will also store directory information indicating the location of the necessary files. The manner of storing information within the memory card 16 is preferably implemented according to known standards. For example, the information is preferably stored in a PCMCIA compatible memory card conforming to the PC Card Standard which conforms to the JEIDA Specific Extensions. This standard is described in the publication entitled "PC Card Standard", Vol. 12, JEIDA Specific Extensions, May, 1995 available from JEIDA (Japan Electronic Industry Development Association), which is incorporated herein by reference.

A feature of the present invention is the omission of a separate switch which is used to place the camera in a communication mode. Conventional digital cameras have a specific switch which changes the camera from a record or play mode to a mode which allows the transmission and receipt of images and audio. A description of how the invention operates without such a switch is set forth in detail below.

Figure 13A:
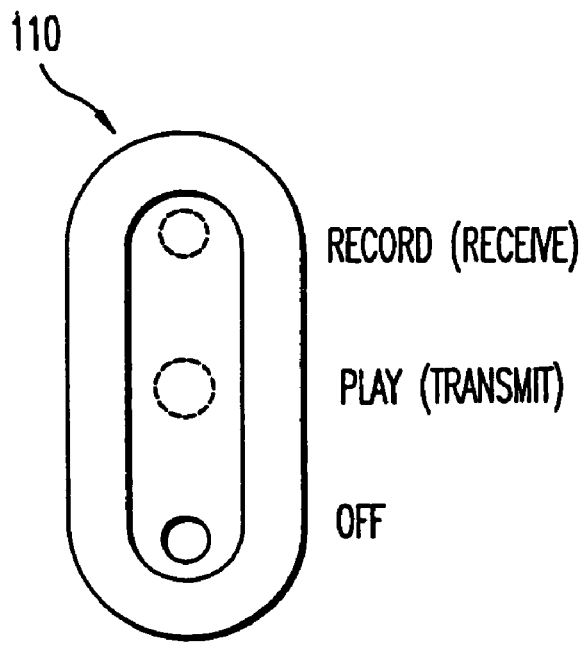
FIG. 13A illustrates a single switch which controls both whether the camera is recording, playing or is off along with whether the camera is receiving or transmitting when connected to an external device.
Figure 13B:
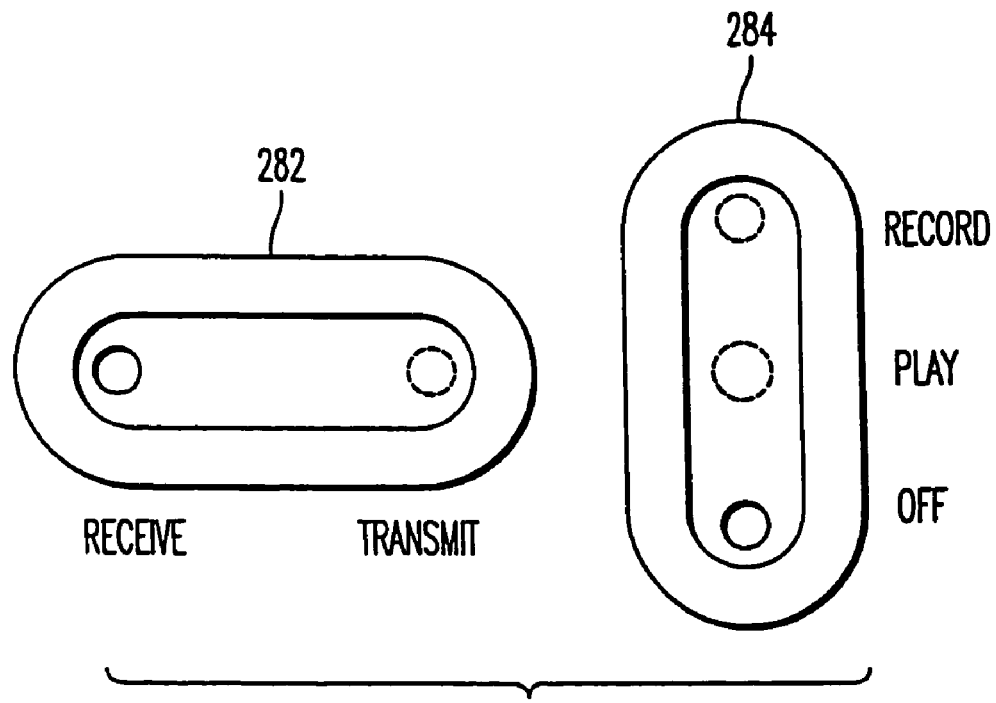
FIG. 13B illustrates two switches; one for placing the camera in a receive or a transmit mode and the other for setting the camera to a record mode, play mode or turning the camera off.

FIG. 13A illustrates a switch 110 which corresponds to switch 110 illustrated on the camera 100 in FIG. 1A. The switch is a three position switch having an off, a play and transmit position, and a record and receive position. When the camera detects that the communication mode is to be used, as explained below, the receive or transmit functions are selected. When the camera is not to communicate, the record or play functions are selected. As an alternative, FIG. 13B illustrates two separate switches 282 and 284, one for determining whether the camera is to be in a receive or transmit mode, and another for deciding whether the camera is to record images, play images, or to be turned off. In FIGS. 13A and 13B, the switches are slidable between the position the switch is in as illustrated by a solid circle and the other possible positions for the switches illustrated by broken circles.

Figure 14:
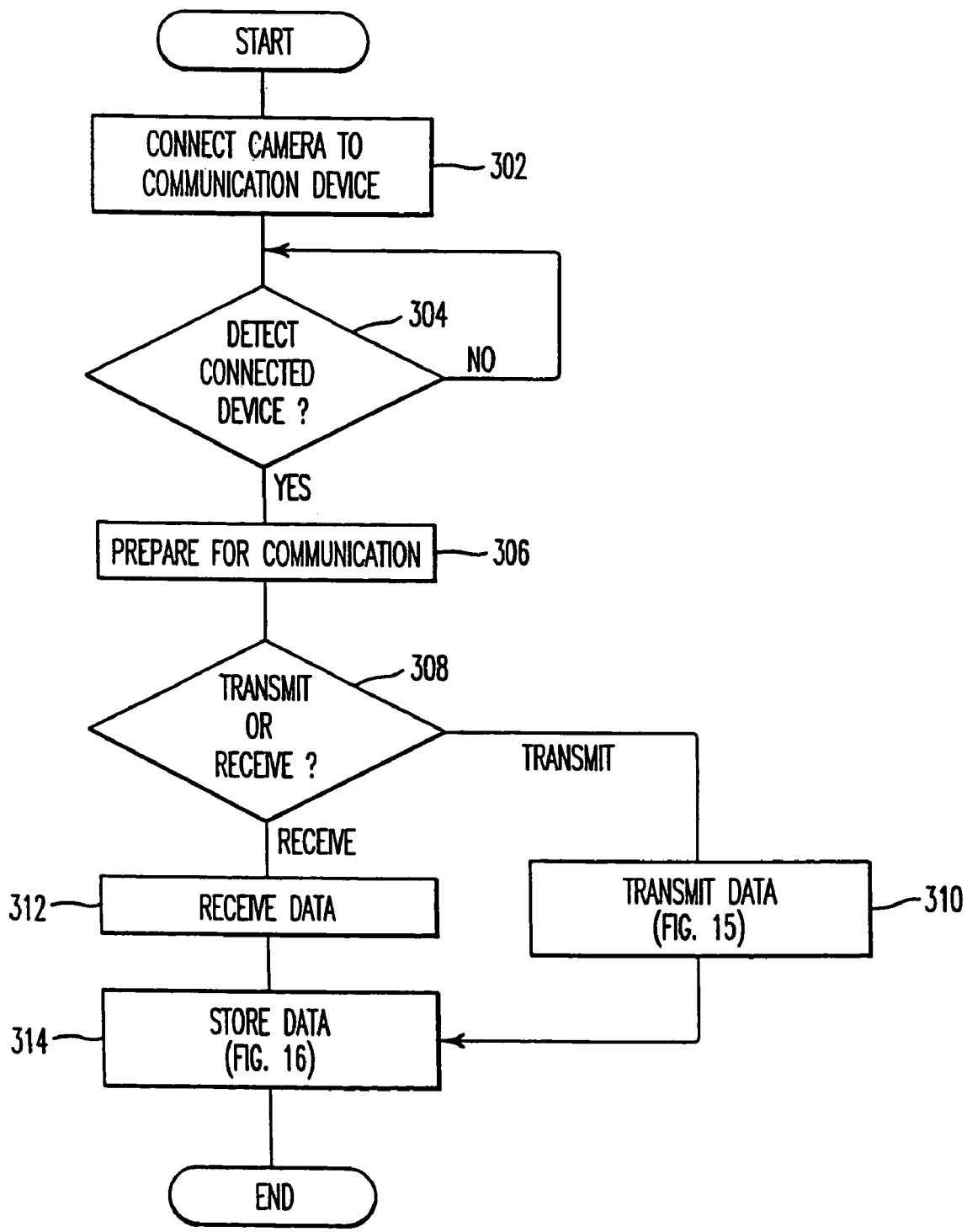
FIG. 14 illustrates a flowchart of the communication process of the camera with an external device.

FIG. 14 illustrates a flowchart of the overall process of transmitting information by the camera, or receiving information by the camera from an external device. The external communication device can be a computer, another camera, or any other device which receives and/or transmits information from the camera. After starting, the user connects the camera to a communication device such as a computer in step 302. At this time or prior to this time, the user will select the type of communication protocol which is to be utilized such as for example, the RS-232 protocol or the RS-422 protocol. Step 304 detects whether the camera is connected to the communication device. This can be performed, for example, by monitoring the Data Terminal Ready (DTR) signal when the communication protocol which is being used is RS-232. The signal line which is monitored is pin no. 4 of the nine pin D connector 188. By monitoring this electric signal from the communication device such as the computer, the switch which places the camera in a communication mode can be eliminated, thus reducing the weight and complexity of the camera. Step 304 has been described with respect to the DTR signal of an RS-232 protocol but any other signal of any other communication protocol which performs a similar function and indicates that the communication device is ready to receive or transmit information from or to the camera may be utilized. Step 304 is repeated until the appropriate signal is detected, indicating that the communication device is ready to communicate with the camera. Step 304 is preferably performed every ½ to 1 second, although longer or shorter times can be utilized.

After an affirmative response from step 304, step 306 is performed which executes or sets up the appropriate communication algorithms within the camera so that the camera will be prepared to transmit or receive information. As an example, before this time, the communication lines except for the DTR line may not be monitored in order to avoid the detection of improper or spurious signals which may occur before or during connection. Step 308 then detects whether the camera is to transmit or receive information based on the position of switch 110 illustrated in FIG. 13 or switch 282 illustrated in FIG. 13B. If the camera is in a transmit mode, step 310 is performed which transmits data according to the process illustrated in FIG. 15. If information is to be received by the camera, steps 312 and 314 respectively receive and store the data according to the process illustrated in FIG. 16. The process of FIG. 14 then ends.

Figure 15:
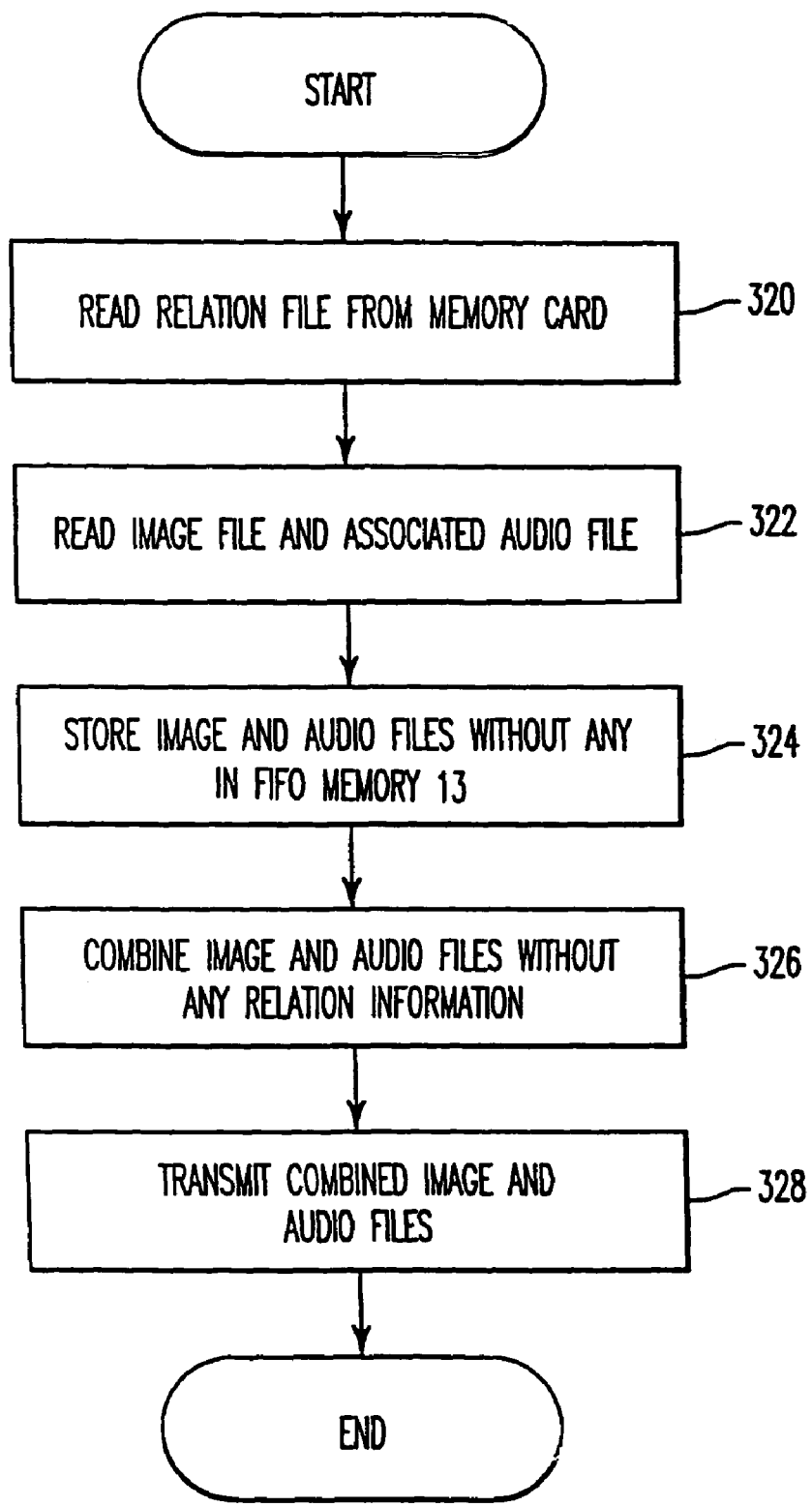
FIG. 15 illustrates the manner of transmitting information of the camera to an external device.

FIG. 15 illustrates a process for transmitting information such as image and audio information out of the camera. In order to transmit the information out of the camera, first the relation file from the memory ca rd is read in step 320. The relation file indicates the correspondence between the image and audio files. Additionally, the relation file will store directory information of the image and audio files. Based on the information in the relation file which has been read in step 320, the image file and the associated audio file are read in step 322 and transferred to the FIFO memory 13 in step 324. These two files are combined in step 326 and the resulting data does not contain any relation information. The combined image and audio files are illustrated as 270 in FIG. 12.

In FIG. 12, the combined image and audio files include a header and corresponding video file 262 and a header along with corresponding audio file 264B. In the example illustrated in FIG. 12, video file one corresponds to audio file one and video file three corresponds to audio file two but there is no corresponding audio information for video file two. After the video and audio information has been combined, the combined information is transmitted out of the camera in step 328 and the process of FIG. 15 ends.

Figure 16:
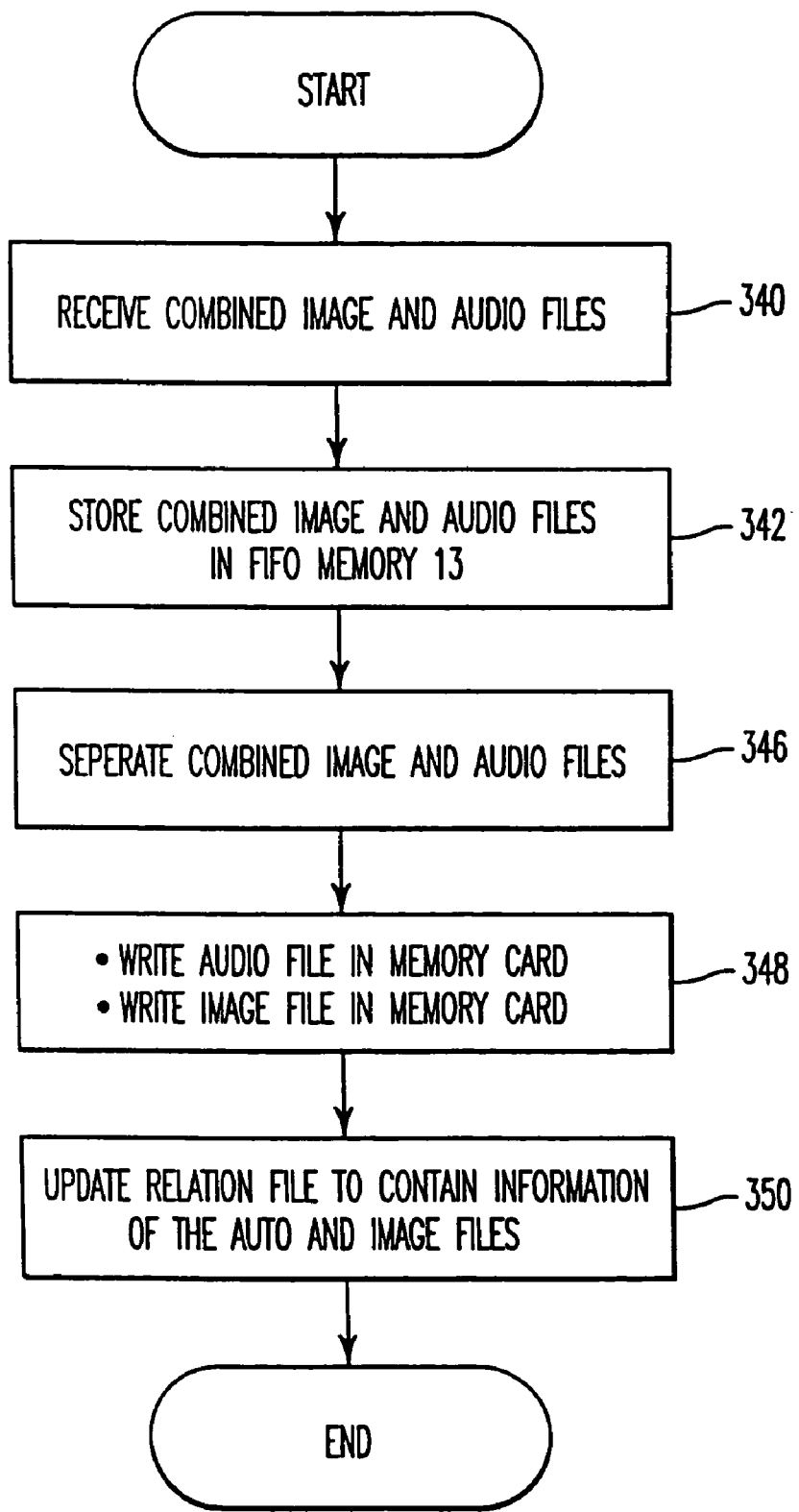
FIG. 16 is a flowchart illustrating the specific steps for receiving and storing by the camera data from an external device.

FIG. 16 illustrates the process for receiving information by the camera. In step 340, combined image and audio files are received for example, through the I/O card 15 or from the communication device 29 through the signal level conversion circuit 28 and the interface circuit 27. When the received information is from the I/O card, or alternatively from the interface circuit 27, the received image and audio files are stored in the FIFO memory 13 in step 342. Next, this combined image and audio information is separated in step 346. The audio information is written into the memory card and the image information is also written into the memory card in step 348. Next, the relation file of the memory card 16 is updated to describe the relationship between the newly received audio and image files in step 350 and the process of FIG. 16 then ends. The relationship information of the memory card indicates that the audio and image files correspond to each other and are to be presented or played at the same time. The relationship information is determined based on the transmission as a unit of the image and audio files.

Another feature of the present invention is the manner in which the digital signals representing images and audio generated within the camera are converted to signals conforming to the RS-232 standard. Unlike the logic signals normally used with a microprocessor within the camera, RS-232 signals are bipolar. This means that a level of zero volts (which corresponds to ground) does not indicate a logical low level but a negative voltage level is necessary to represent a logical low level. The voltage value for a "1" is preferably between +5 volts, and +15 volts and for a "zero" preferably between -5 volts and -15 volts.

Figure 17:
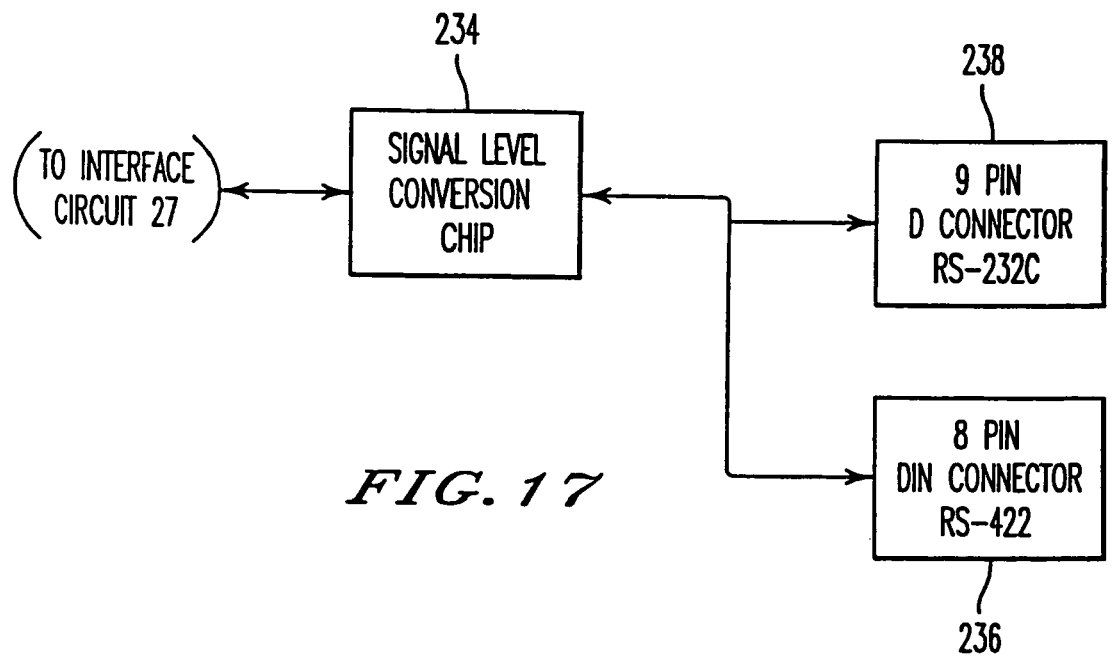
FIG. 17 is a functional block diagram of the electrical components within the external communication interface.

In order to convert signals to their appropriate levels, there is a signal level conversion chip 234, illustrated in FIG. 17, within the external communication interface 180. This signal level conversion chip is, for example, a commercially available integrated circuit such as the MAX 213 CAI available from Maxim, or the UP04724 available from NEC. The signal level chip 234 is connected between the interface 27 and the connectors 238 and 236 according to known manufacturer's specifications. The nine pin D connector 238 and eight pin DIN connector respectively have the pin definitions as set forth in Table I and II below.

TABLE I

9 PIN D RS-232 CONNECTOR

| Signal Number | Signal Function | |
|---|---|---|
| | Abbreviation | Function |
| 1 | CD | Carrier Detect |
| 2 | RD | Received Data |
| 3 | SD | Send Data |
| 4 | ER | Data Terminal Ready |
| 5 | SG | Signal Ground |
| 6 | DR | Data Set Ready |
| 7 | RS | Request to Send |
| 8 | CS | Clear to Send |
| 9 | CI | Call Indicate |

TABLE II

8 PIN DIN RS-422 CONNECTOR

| Signal Number | Signal Function | |
|---|---|---|
| | Abbreviation | Function |
| 1 | HSKO | Handshake Output |
| 2 | HSKI | Handshake Input |
| 3 | TXD- | Transmission Data |
| 4 | GND | Ground |
| 5 | RXD- | Receiving Data |
| 7 | GPI | Call Indicate |

Figure 18:
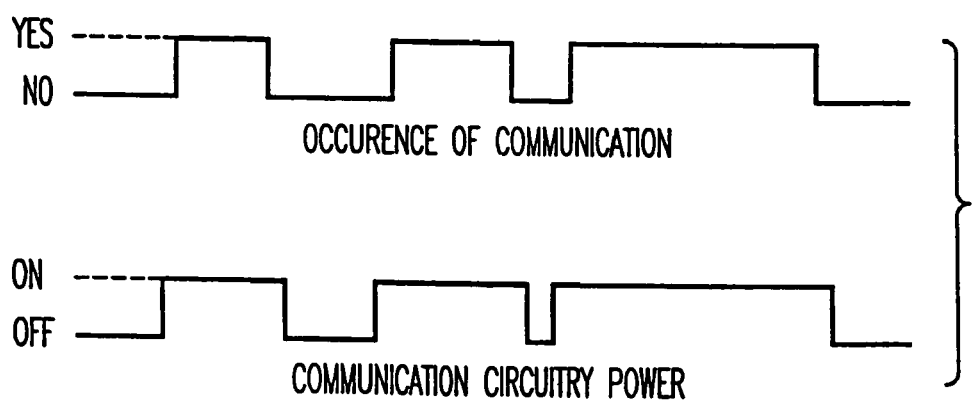
FIG. 18 illustrates a timing diagram showing how power to the communication circuitry is reduced in order to conserve the life of a camera battery.

The power supplied to the signal level conversion chip 234 originates from the camera. The signal level conversion chip 234 may consume power, even when no communication operation is occurring. In order to extend the battery life of the camera by not wasting power unnecessarily powering the signal level conversion chip 234, the present invention employs a power conservation feature which places the signal level conversion chip 234 in a low-power mode or standby mode. As an example of the operation of the power conservation function, there is a timing diagram illustrated in FIG. 18. The top line of this diagram illustrated the occurrence of communication and the bottom line illustrates when the communication circuitry such as the signal level conversion chip 234 is powered. In this figure, it can be seen that the communication circuitry is powered for a short time before and after the occurrence of communication. When communication is not occurring, the power to the communication circuitry is turned off or changed to a standby mode.

In order to place the communication circuitry or signal level conversion chip 234 in the standby or low-power mode, the CPU within the camera monitors the Data Terminal Ready (DTR) line of the RS-232 connection. When this line is low, the external communication device such as a computer is not ready to perform communication and the signal level conversion chip may have the power thereto reduced. To the contrary, when the DTR signal is high, the external device is ready to communicate through the signal level conversion chip and accordingly, the communication circuitry must be powered. The checking of the signal which indicates that communication is ready to occur is performed at least once every second in the preferred embodiment. However, this checking frequency may be made shorter by checking the DTR signal once ever at least one half second or longer by checking the DTR signal once every five seconds, once every ten seconds, or even longer.

Obviously, numerous modifications and variations of the present invention are possible in light of the above teachings.

For example, the invention can be implemented using one or more microprocessors, integrated circuits, convention circuit elements or other desired hardware. It is therefore to be understood that within the scope of the appended claims, the invention may be practiced otherwise than as specifically described herein.

The invention claimed is:

1. A digital camera, comprising:
   a processing unit configured to control an operation of the digital camera in one of plural operating modes, the plural operating modes including at least a recording mode for recording an image data corresponding to a subject, a playback mode for playback of a picture corresponding to the image data, and a communication mode for communicating with a computer;
   a camera body including an image photographing section;
   a connector configured to connect the digital camera to a computer; and
   a switch configured to select the recording mode or the playback mode as the operating mode;
   wherein the processing unit switches the operating mode out of a current operating mode selected by the switch into the communication mode after detecting a signal provided from the computer via the connector.

2. A digital camera as in claim 1, wherein the connector has plural pins and the processing unit monitors the signal status on one of the pins to detect the connection of the computer so as to switch the operating mode.

3. A digital camera as in claim 2, wherein the processing unit monitors the signal status by periodically monitoring the signal on the pin to detect connection to the computer.

4. A digital camera as in claim 1, wherein the processing unit consists of a single chip.

5. A digital camera as in claim 1, wherein the processing unit includes plural components.

6. A digital camera as in claim 1, wherein the processing unit sets up appropriate communications algorithms so that the camera is prepared to communicate with the computer based on detection of connecting to the computer.

7. A digital camera as in claim 1, wherein the processing unit is configured to provide communicating with the computer in accordance with a standard communication protocol.

8. A digital camera as in claim 7, wherein the standard communication protocol is RS-232C.

9. A digital camera as in claim 1, wherein the image photographing section includes an image sensor.

10. An image-capturing device comprising:
    an image sensor configured to receive light from a subject;
    a memory configured to store an image data corresponding to the subject;
    a processing unit configured to control an operation of the image-capturing device in one of plural operating modes, the plural operating modes including a recording mode for recording image data corresponding to a subject, a playback mode for playback of a picture corresponding to image data, and a communication mode for communicating with a computer;
    a switch configured to select the recording mode or the playback mode as the operating mode; and
    a connector configured to connect the image-capturing device to the computer,
    wherein the processing unit switches the operating mode out of a current operating mode selected by the switch into the communication mode after detecting a signal provided from the computer via the connector.

11. An image-capturing device as in claim 10, wherein the connector has plural pins and the processing unit monitors the signal status on one of the pins to detect the connection of the external device so as to switch the operating mode.

12. An image-capturing device as in claim 11, wherein the processing unit monitors the signal status by periodically checking the signal on the pin to detect connection to the external device.

13. A method of controlling image-capturing device having a connector for connection to an external device, comprising the steps of:
    operating the image-capturing device in one of plural non-communication operating modes in accordance with the setting of a switch on the image-capturing device, the plural non-communication operation modes including at least a recording mode for recording image data corresponding to a subject, and a playback mode for playback of a picture corresponding to image data;
    detecting a signal provided from the external device via the connector to the image-capturing device;
    switching the operating mode of the image-capturing device out of a current operating mode selected by the switch into a communication mode for communication with the external device, in response to the detection of the signal; and
    communicating picture information from the image-capturing device to the computer while in the communication mode.

14. A data reproducing device comprising:
    a memory configured to store data;
    a reproducing unit configured to reproduce the data stored in the memory;
    a processing unit configured to control an operation of the data reproducing device in one of plural operating modes, the plural operating modes including a recording mode for recording image data corresponding to a subject, and a communication mode for communicating with a computer to transfer the data from the memory to an external device; and
    a connector configured to connect the data reproducing device to the external device,
    wherein the processing unit switches the operating mode out of the reproducing mode into the communication mode after detecting a signal provided from the external device via the connector.

* * * * *